United States Patent [19] [11] 4,110,563
May et al. [45] Aug. 29, 1978

[54] TRAFFIC SENSITIVE MODULATION SYSTEM

[75] Inventors: Peter J. May, Yorba Linda; Theodore M. Stump, Costa Mesa, both of Calif.

[73] Assignee: The Anaconda Company, New York, N.Y.

[21] Appl. No.: 779,500

[22] Filed: Mar. 21, 1977

[51] Int. Cl.² .............................................. H04J 3/04
[52] U.S. Cl. ............................................. 179/15 BW
[58] Field of Search ........ 179/15 BW, 15 AS, 15 BA, 179/18 BC

[56] References Cited

U.S. PATENT DOCUMENTS

| 3,508,007 | 4/1970 | Goodall | 179/18 BC |
| 3,564,413 | 2/1971 | Uchida | 179/15 BA |
| 3,588,364 | 6/1971 | Wallingford | 179/15 BW |
| 3,707,680 | 12/1972 | Gabbard | 179/15 BW |
| 3,927,268 | 12/1975 | Sciulci | 179/15 BW |
| 4,032,719 | 6/1977 | Blasbalg | 179/15 AS |

Primary Examiner—David L. Stewart
Attorney, Agent, or Firm—William W. Haefliger

[57] ABSTRACT

A modulation system for use in analog signal transmission processes input information in multiple analog communication channels, for multiplexing onto a data channel. The system includes:

a delta modulator and logic circuitry connected therewith to suppress data transmission when the modulator produces alternating 1's and 0's and to signal activation of pulse transmission when a successive sequence of at least two 1's and two 0's is transmitted by the modulator.

11 Claims, 6 Drawing Figures

TRAFFIC SENSITIVE MODULATION SYSTEM

BACKGROUND OF THE INVENTION

This invention relates generally to traffic sensitive digital communications systems; more particularly, it concerns the provision of asynchronous, adaptive codecs in such systems.

U.S. Pat. No. 3,898,387 to Fort discloses an asynchronous digital voice communications systems suitable to switching system application and potentially a ditigal transmission system. The analog to digital conversion mechanism is FM in nature. The system has the great merit of adapting itself automatically to the traffic imposed on the system with degradation of quality of the signal resulting during high traffic periods rather than physical space blocking normally encountered in most switching systems. Chapter 7 of the text, "Delta Modulation Systems" published by Halsted Press (Wiley) by R. Steele discusses several kinds of syllabically companded delta modulation A/D converters which are very efficient regarding the effective channel bit rate required to accommodate the wide dynamic range of the signals required in telephone networks. These continuously variable slope delta modulation (CVSDM) codecs usually operate synchronously and are therefore suitable for multiplexing purposes in multi-channel communication systems. Chapter 6 of that text discusses the possibility of asynchronous delta modulators which would be suitable for the interface of the system described in the above referenced Fort patent. There are three examples of such asynchronous delta modulators, namely: FIGS. 6.1, 6.4, 6.7. Each has its own advantages and disadvantages depending upon application but all are linear DM codecs (asynchronous). They are, therefore, not efficient as regards channel bit rate under the conditions of wide dynamic range of the signal to be encoded.

SUMMARY OF THE INVENTION

An important object of the present invention is to provide an A/D converter which is asynchronous and adaptive, and which when used in a system as described in the Fort patent will provide a very efficient communications system, for data switching or transmission purposes. The codec would adapt the threshold of the quantizing step in the asynchronous encoder to the level of the incoming signal the same way the CVSDM coders do. The asynchronous nature of the codec would provide the transmission of bits only when information is changing in level (compared to synchronous codecs) which reduces the average bit rate per channel to the lowest possible level. The digital output (asynchronous) would then, for example, be processed in a system similar to that described in the Fort patent with addressing bits required for multiplexing and distribution. The system resulting would be adaptive in all senses, level as a function of time per channel, and quality of the multiplexed system as a function of the traffic imposed. This would allow a minimum speed system for a given number of channels, which adapts to the traffic with graceful degradation as the traffic increases.

Basically, the invention is embodied in a modulation system for use in analog signal transmission, in which input information in multiple analog communication channels is processed for multiplexing onto a data channel, and comprises:

a. first means for sampling the input analog signal in one of the communication channels, and to produce output pulse transmission in that channel in correspondence with such sampling, and b. other means operatively connected with the first means to signal activation of pulse transmission for multiplexing onto the data channel when the output of the first means is indicative of active transmission of information in the communication channel, whereby output pulse transmission derived from another communication channel may be multiplexed onto the data channel when there is an absence of information transmission in the one communication channel (i.e. it is idle).

As will be seen, the first means may comprise a delta modulation encoder; the other means may comprise logic circuitry which signals a "request" for output pulse transmission to the data channel via the multiplexer, in response to transmission by the encoder of a pattern of 1's and 0's (as for example two 1's or two 0's) indicative of active transmission of information; the logic circuitry may include a polarity path in which a polarity pulse is transmitted in response to detection of at least two 1's, or two 0's (but not both); and additional means may be provided in association with each channel for receiving data demultiplexed from the data channel for reconstituting an analog signal from the received data of the type described.

These and other objects and advantages of the invention, as well as the details of an illustrative embodiment, will be more fully understood from the following description, and drawings, in which:

DRAWING DESCRIPTION

DETAILED DESCRIPTION

Figure 1:
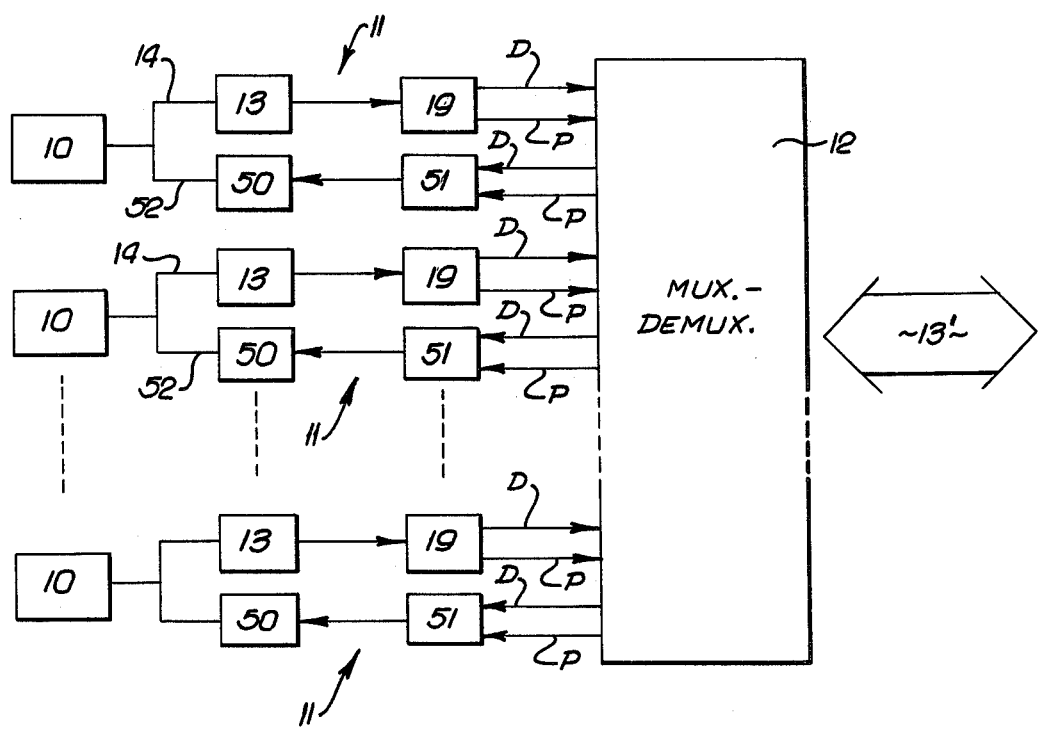
FIG. 1 is a block diagram of a system incorporating the invention.

The system shown in FIG. 1 includes sources 10 of analog signals, as for example telephone hand sets. Multiple analog communication channels 11 are connected in parallel between the sources 10 and the multiplexing-demultiplexing means 12. The latter may for example take the asynchronous form as described in U.S. Pat. No. 3,898,387 to Fort. Other known asynchronous multiplexing techniques may also be used. The data channel onto which the information is multiplexed is indicated at 13'.

Figure 2:
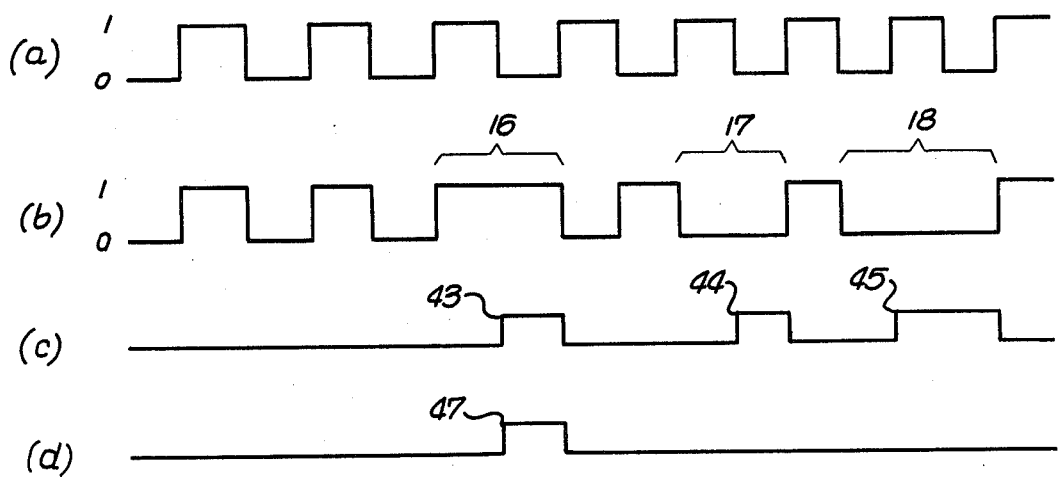
FIG. 2 illustrates wave forms.

Connected in each channel 11 is an encoder 13 (analog to digital converter), which constitutes a means for sampling the input analog signal at 14 to produce output pulse transmission in the channel in correspondence with such sampling. If the channel is idle, it produces an alternating sequence of 1's and 0's as seen in FIG. 2 (a). If analog information is being transmitted, the encoder produces a succession of 1's corresponding to samplings of a positive slope of the analog signal, and a succession of 0's corresponding to samplings of a negative slope of the signal. FIG. 2 (b) shows a succession of 1's at the location 16, and a succession of 0's at the locations 17 and 18, for example. Delta modulation techniques are typically employed, one such technique being disclosed in U.S. Pat. No. 3,091,664 to Tyrlick.

Figure 3:
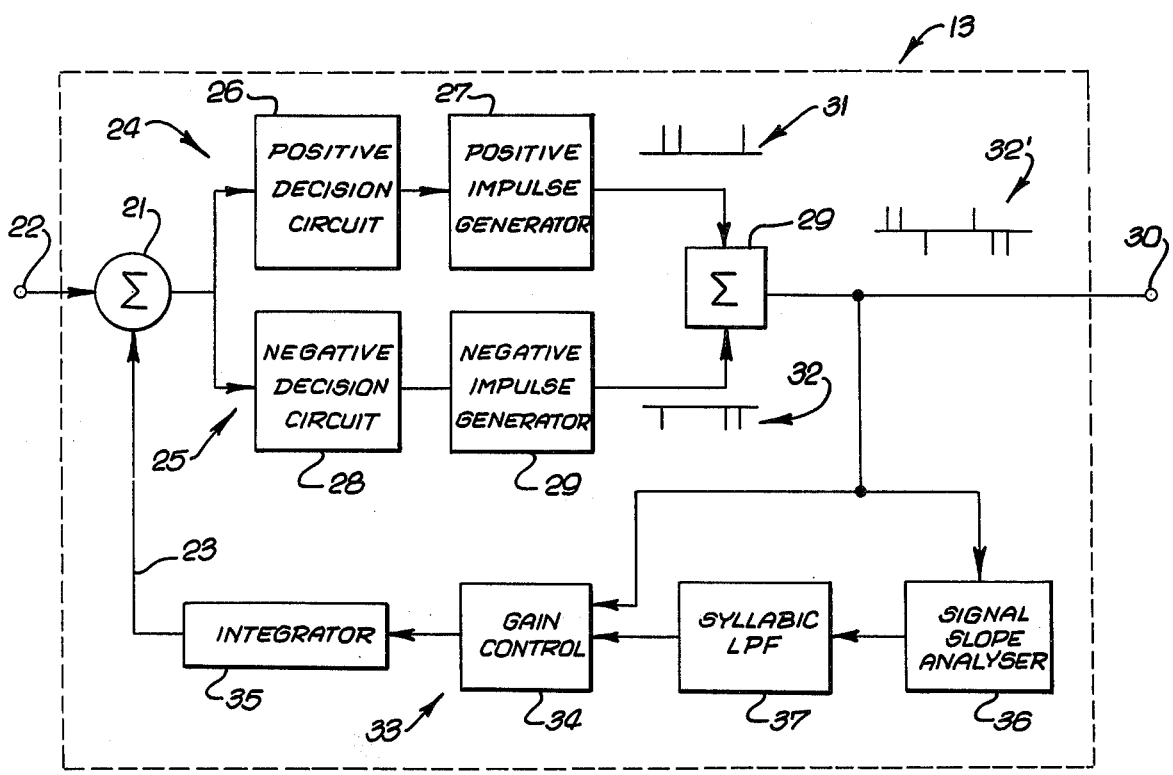
FIG. 3 is a block diagram of an encoder.

Referring to FIG. 3, the delta modulation circuit 13 is shown to include a summing junction 21 receiving analog input from terminal 22 and analog input from path 23. The output from the junction 21 is passed to parallel branches 24 and 25; branch 24 including a positive decision circuit 26 and a positive impulse generator 27, and branch 25 incorporating a negative decision circuit 28 and a negative impulse generator 29. Circuits 26 and 28 sense whether the analog signal is increasing or decreasing, and if so the respective generators 27 and 29 are activated. The outputs from the two generators are summed at 29 and passed to output terminal 30. Typical outputs from the generators are seen at 31 and 32, and their sum at 32'.

The feed back loop 33 includes gain control and integrator circuits 34 and 35, operating to integrate the summed output pulses delivered to terminal 30, thereby to provide a stairstep analog signal at path 23. Note also the signal slope analyser and syllabic low pass filter circuits 36 and 37 connected in series as shown between the output of summing circuit 29 and the gain control 34.

In accordance with an important aspect of the invention, other means is provided, as at 19 in FIG. 1, and operatively connected with the encoder 13, in each channel 11, to signal activation of pulse (data) transmission for multiplexing onto the data channel when the output of the encoder is indicative of active transmission of information in the communication channel. In the absence of transmission of information in the one communication channel, it is in idle state. Accordingly, output pulse transmission derived from another channel 11 may be multiplexed onto the data channel when there is absence of information transmission in the one communication channel, i.e. it is idle. Therefore, in a multiplexing scheme where there are "$n$" available time slots, in a clock period, onto which data from "$n + x$" communication channels (some active and some idle) is to be multiplexed, the invention enables the placing of any active channel in any available time slot, i.e. the transmission of data in channel 13' is asynchronous (address bits are not periodic). Thus, means 19 may be regarded as an idle channel suppression circuit. Therefore, the system will provide for an increase in the number of communication channels that can be transmitted over a given data channel, compared to systems where each channel is allotted a particular number of bits per second in a synchronously multiplexed system. The strategy used is to transmit data only when signal changes occur. This provides a large decrease in data channel bit rate since in voice communication channel systems the average time usage per channel is low, and in normal conversation the usage in each direction is less than one-half on an average. (This could apply to some data channels as well.)

Figure 5:
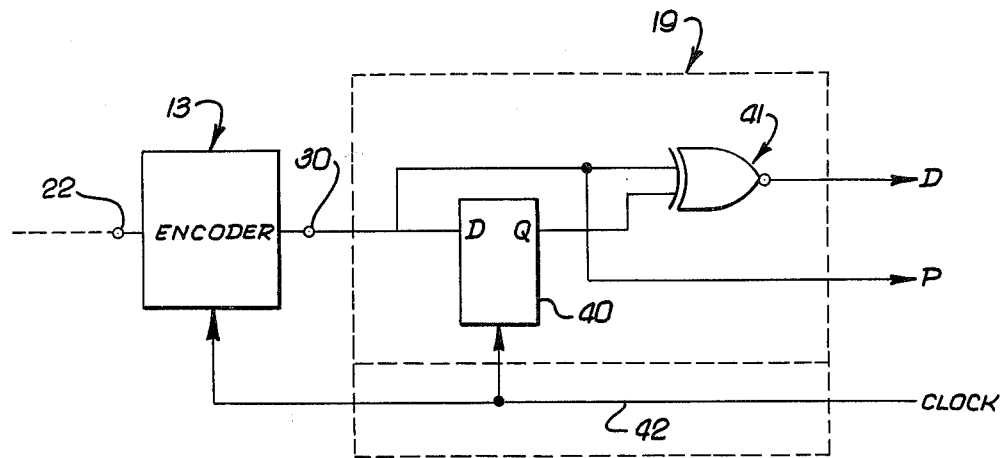
FIG. 5 is a diagram of logic circuitry responsive to encoder output to produce request and polarity pulses.

One example of the circuit means 19 is shown in FIG. 5 to include a flip flop 40 and an EXNOR gate 41, connected as shown. Clock input to the flip flop and encoder is shown at 42. The D (data) output from the circuit 19 is for example illustrated in FIG. 2(c). As there shown, a "request" pulse 43 is transmitted when at least two successive 1's are transmitted by the encoder (indicating an initial rise in the value of the analog input signal); also, a "request" pulse is transmitted when at least two successive 0's are transmitted by the encoder, as shown by pulses 44 and 45 (and indicating an initial drop in the value of the analog input signal). The circuit 19 also has a P (polarity) output path as shown in FIG. 5. As seen in FIG. 2(d), when two successive 1's are transmitted by the encoder, the polarity path transmits a positive pulse 47, whereas when two 0's are transmitted by the encoder the polarity path does not transmit a pulse. In this regard, during idle periods of the channels, as represented by the wave form (a) in FIG. 2, no pulses are transmitted on the P and D paths.

Accordingly, the output data on path D will be transmitted only when there are successive 1's or 0's. Each time data is transmitted, an address word is typically added to the data polarity bit, on path P, to direct the data to the proper communication channel associated with a "receive" instrument, for example. Bit contention between channels is typically handled by employing a priority logic system at multiplexing means 12, so that statistical delays are encountered as a function of traffic.

Additional means is associated with each channel 11 for receiving data demultiplexed from the data channel, as by the demultiplexer 12, and transmitted to the addressed communication channel, for reconstructing an analog signal from the received data. That analog signal is then transmitted to the instrumentality 10. Such additional means typically and advantageously includes a delta modulation decoder 50, as well as other logic circuitry 51 connected to the input side of the decoder to be responsive to received asynchronous data pulses to produce a reconstructed pattern of 1's and 0's; the latter are then decoded at 50 to produce the reconstructed analog signal at 52. Thus, the form of the signal at point 52 is the same as the form of the signal at 30. In this regard, and referring to FIG. 6, the logic means 51 may include gates 60–64, inverter 65, and flip-flops 66 and 67, connected as shown.

Figure 4:
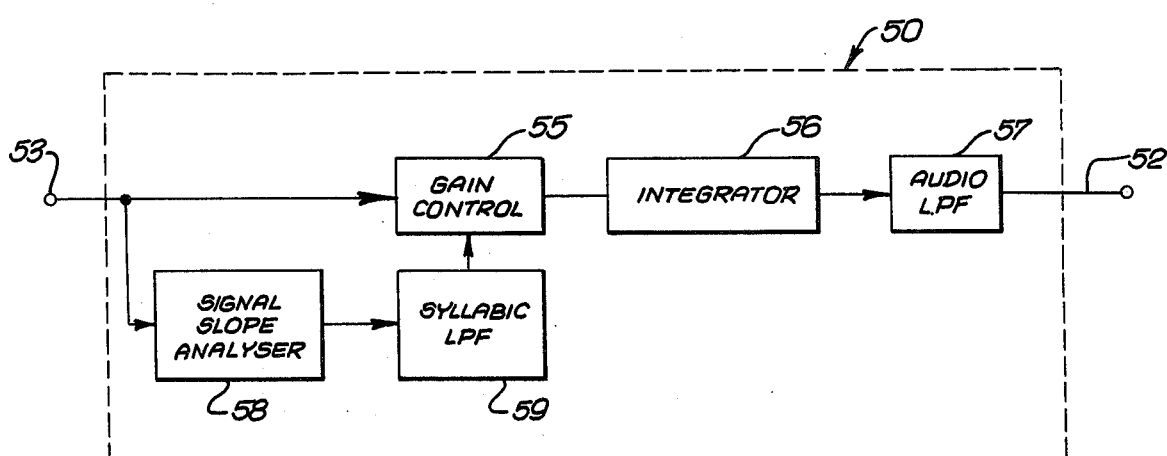
FIG. 4 is a block diagram of a decoder.

The decoder 50 shown in FIG. 4 includes gain control 55, integrator 56 and audio low pass filter 57, connected in series sequence. The gain control also receives input from the branch that includes signal slope analyser 58 and syllabic low pass filter 59, connected in series, as shown.

From the foregoing, it is clear that output data is transmitted to the multiplexer only when there are successive 1's or 0's. Also, the signal is logically reconstructed at the receiving end from a knowledge that if nothing is received, the encoder is outputting alternate 1's and 0's. Each time data is transmitted, an address work is added to the data polarity bit, to direct the data to the proper receiving channel. Bit contention between channels is typically handled by using a priority logic system, so that statistical delays are encountered as a function of traffic.

It should be understood that the codec can be linear (uniform quantizing) with high sampling rate where the system bandwidth will allow (such as switching systems) or non-linear (companded) in the case where the system bandwidth is a constraint such as applied to a line or radio transmission system. One trades off circuit complexity and resulting cost for bandwidth depending upon the application.

Referring again to FIG. 5, it shows the circuit which suppresses data transmission when no input analog signal is present. As is well known, the output 30 of a delta modulator encoder is an alternating one-zero pattern. The circuit of FIG. 5 stores the data for one bit, at 40. This stored data is compared with the next data bit with an "exclusive nor" (EXNOR) circuit at 41, to give the output data indication D. An "exclusive nor" has the property that the output will be a logic "one" only if both inputs are at the same logic level (i.e. both "ones" or both zero's). The polarity bit "P" in FIG. 5 is transmitted to the receiver to indicate whether a pair of ones or zeros are present.

Figure 6:
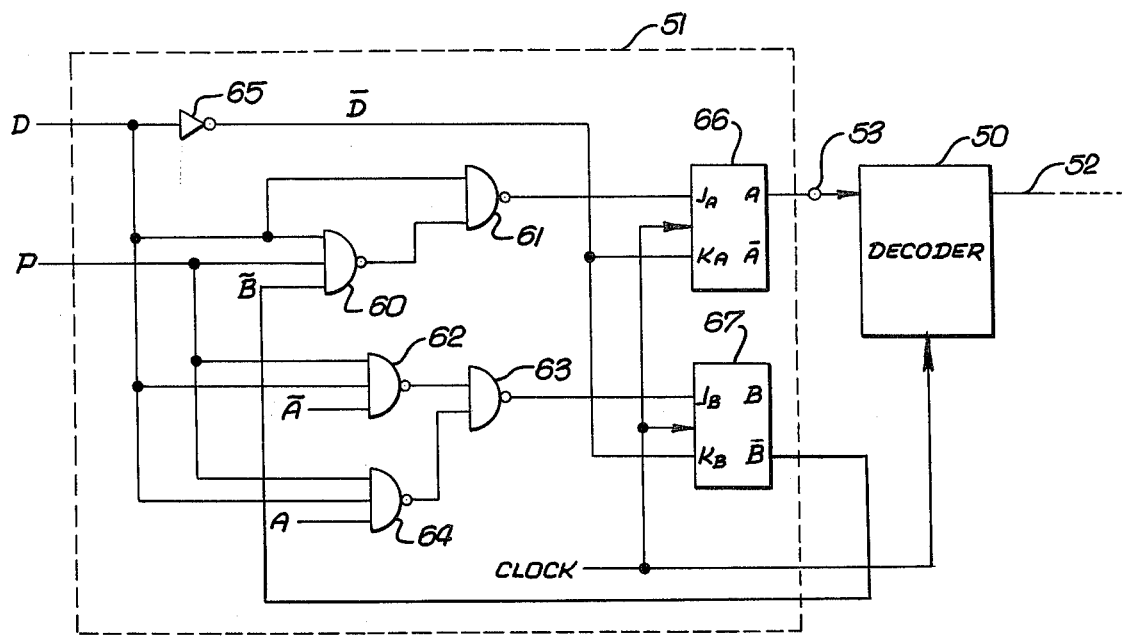
FIG. 6 is a diagram of logic circuitry to reconstruct a data stream for transmission to the decoder.

FIG. 6 circuitry performs the inverse function of FIG. 5. The combination of NAND gates 60 thru 64 and inverter 65 are logically connected to provide the inverse control function required to drive flip-flops 66 and 67 as follows. In the absence of a data input "O" the output of flip-flop 66 will produce alternate one-zero's at the clock rate. When data occurs 66 is forced to the proper state indicated by "P". Flip-flop 67 provides for start-up synchronization of the bit stream.

We claim:

1. In a modulation system for use in analog signal transmission, in which input information in multiple analog communication channels is processed for asynchronous multiplexing onto a data channel, the combination comprising
   a. first means for sampling the input analog signal in one of said communication channels, and to produce addressed asynchronous output pulse transmission in said channel in correspondence with said sampling, and
   b. other means operatively connected with said first means to signal activation of pulse transmission for multiplexing onto the data channel only when the output of said first means is indicative of active transmission of information in the communication channel, whereby output pulse transmission derived from another communication channel may be multiplexed onto the data channel when there is an absence of information transmission in the one communication channel,
   c. said first means including a delta modulator operable to transmit an alternating sequence of 1's and 0's during absence of information transmission in said one channel, and said other means includes logic circuitry means connected to the delta modulator to detect a successive sequence of at least two 1's or at least two 0's transmitted by the modulator as indicating said active transmission of information.

2. The combination of claim 1 including multiplexing means connected with said communication channels for asynchronously multiplexing pulse transmission from said communication channels onto the data channel.

3. The combination of claim 1 including a telephone source of said analog information connected with said first means.

4. The combination of claim 1 wherein said logic circuitry means includes a storage element connected with the delta modulator to store the output from the delta modulator, for one bit, and a comparison element connected with the delta modulator and with the storage element and to produce a request pulse transmitted on a data path to multiplexing means in response to input detection of at least two 1's or at least two 0's.

5. The combination of claim 4 wherein said logic circuitry includes a polarity path on which a polarity pulse is transmitted in response to said detection of at least two of said 1's or 0's, and on which no polarity pulse is transmitted in response to said detection of at least two of said 0's or 1's, respectively.

6. The combination of claim 4 including said multiplexing means characterized as asynchronously multiplexing information pulses from active information transmitting communication channels into available time slots within repeated clock time periods for transmission on the data channel.

7. The combination of claim 1 including a decoder in said one communication channel to be responsive to received information pulse transmission for producing an analog version thereof.

8. The combination of claim 1 including additional means associated with said one channel for receiving data demultiplexed from the data channel and transmitted to said one communication channel, for reconstructing an analog signal from said received data.

9. The combination of claim 8 wherein said additional means includes a delta modulation decoder.

10. The combination of claim 9 wherein said additional means includes other logic circuitry connected to the input side of said decoder to be responsive to received asynchronous data pulses to produce 1's and 0's in a pattern to be decoded as said reconstructed analog signal.

11. In a modulation system for use in analog signal transmission, in which input information in multiple communication channels is processed for multiplexing onto a data channel, the combination comprising
   a. first means for sampling the input analog signal in each of said communication channels, and to produce addressed asynchronous output pulse transmission in said channels in correspondence with said sampling, and
   b. other means connected with said first means to signal activation of pulse transmission for multiplexing onto the data channel only when the sampling is indicative of active transmission of information in the communication channels, whereby output pulse transmission derived from active information transmitting communication channels may be multiplexed onto the data channel in available time slots temporarily not utilized for transmission of pulses from inactive communication channels, said multiplexing being asynchronous,
   c. said first means including a delta modulator operable to transmit an alternating sequence of 1's and 0's during absence of information transmission in said one channel, and said other means includes logic circuitry means connected to the delta modulator to detect a successive sequence of at least two 1's or at least two 0's transmitted by the modulator as indicating said active transmission of information,
   d. said logic circuitry including means to suppress data transmission when the output of the delta modulator is an alternating one-zero pattern.

* * * * *